Figure 1:
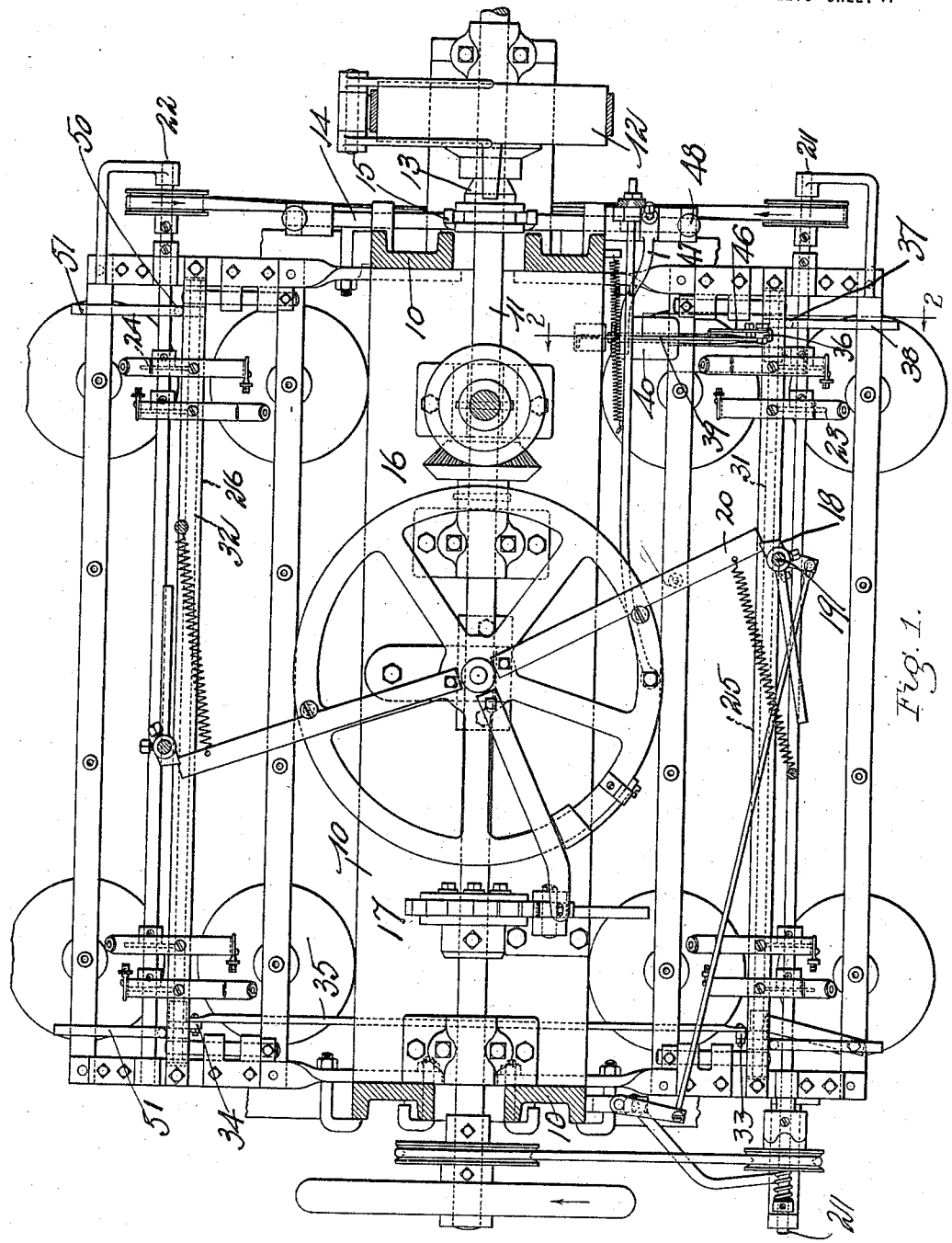

W. T. BARRATT.
STOP MOTION MECHANISM.
APPLICATION FILED FEB. 11, 1916.

1,186,645.

Patented June 13, 1916.
2 SHEETS—SHEET 1.

Inventor:
William T. Barratt.

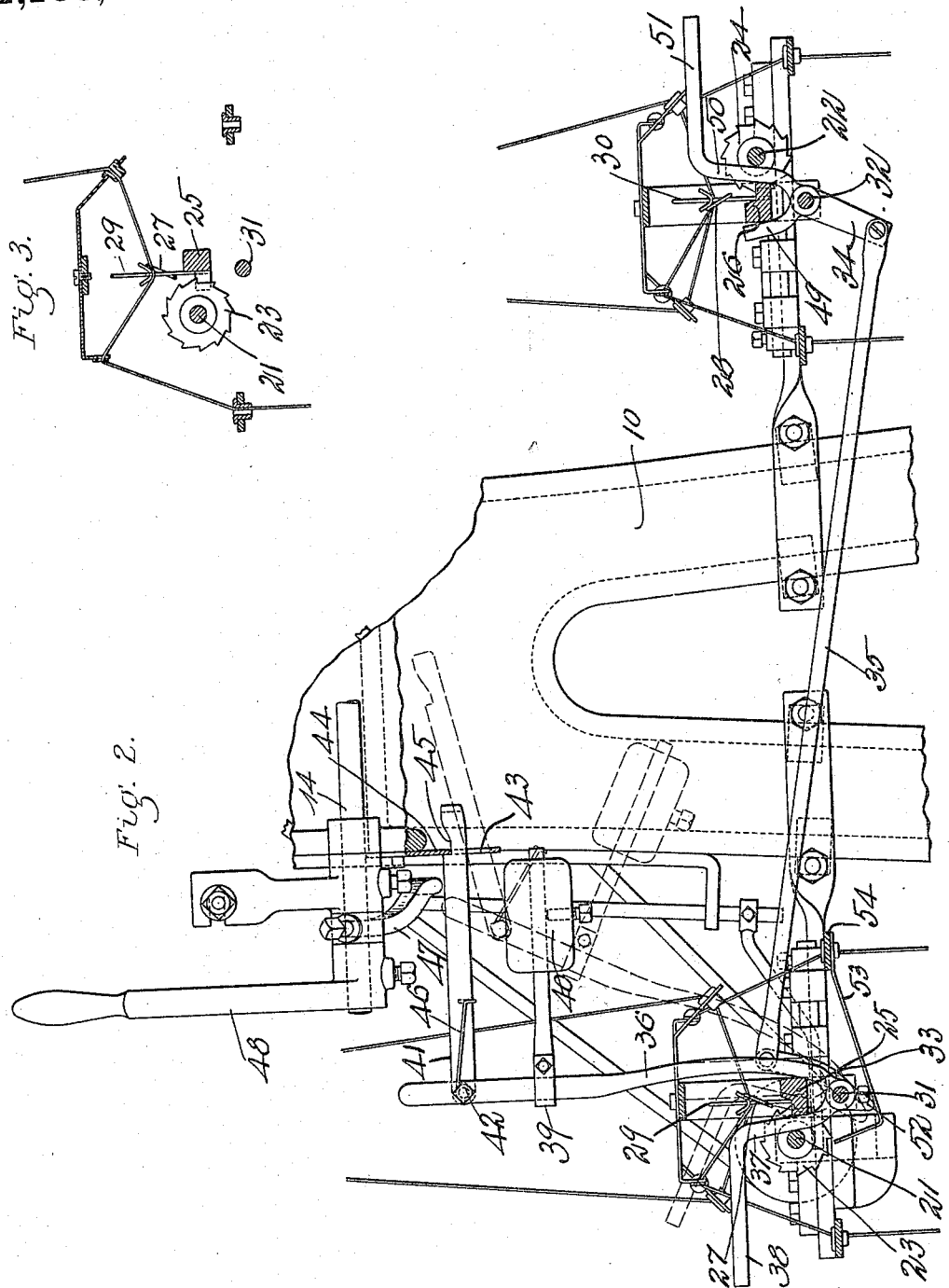

UNITED STATES PATENT OFFICE.

WILLIAM T. BARRATT, OF BENNINGTON, VERMONT.

STOP-MOTION MECHANISM.

1,186,645.  Specification of Letters Patent.  Patented June 13, 1916.

Application filed February 11, 1916. Serial No. 77,783.

*To all whom it may concern:*

Be it known that I, WILLIAM T. BARRATT, a citizen of the United States, residing at Bennington, in the county of Bennington and State of Vermont, have invented new and useful Improvements in Stop-Motion Mechanism, of which the following is a specification.

This invention relates to improvements in stop motion mechanisms for machines in which a strand or strands of yarn are employed in the manufacture of fabric.

The particular embodiment of my invention hereinafter set forth in the specification and embodied in the claims is particularly adapted for use in connection with knitting machines.

The object of the invention is to provide a stop mechanism which will stop the machine when the yarn feeding into the machine is subjected to excess tension or undue strain, or when the strand of yarn becomes knotted or has kinks or enlargements therein, said stop motion mechanism being adapted to operate to stop the machine under such conditions.

This invention is an improvement upon the invention set forth in an application made by me for stop motion mechanism filed March 16, 1915, Serial No. 14,744 of the series of 1915, and patented February 29, 1916, No. 1,173,244. As in said application, the present invention embodies a clutch mechanism which is thrown out of operation by a stop mechanism, whereupon a brake is applied to stop the machine quickly, and said stop motion mechanism embodies a rotary stop member and a normally stationary stop member which is movable toward and away from the rotary stop member. Said normally stationary stop member has thereon a device which is adapted to guide a drop device between and into interlocking engagement with said rotary and stationary stops, whereupon the rotation of the shaft of the rotary stop member is stopped and thereupon the stop mechanism is actuated to throw out the clutch. A plurality of rotary stop members may be used upon one rotary shaft with a single stationary stop member and the rotary stop members in combination with a stationary stop member may be duplicated upon opposite sides of the machine and connected together so as to operate simultaneously.

In the machine of said application, it was necessary, after the machine had been stopped, and when it was desired to start the machine again to throw out the stationary stop member and hold it out of operative position relatively to the rotary stop member until the machine had been started and the different yarns had picked up their respective drop devices, whereupon the operator released the stationary stop member and allowed springs to operate to bring said stationary stop member into operative relation with the rotary stop member. Means were also provided to be set by the operator to hold said stationary stop member out of operative relation with said rotary stop member.

The particular object of this invention is to render it unnecessary for the operator to hold the stationary stop member out of operative position relatively to the rotary stop member until the yarns have picked up their respective drop devices after the machine has been started and sufficient tension has developed in the yarn to pick up said drop devices. To accomplish this object means are provided to automatically move the stationary stop member out of operative position relatively to the rotary stop member just as the machine stops and to hold said stationary stop member out of operation so that, when the machine is started again, all that the operator has to do is to move the clutch lever to throw the clutch into operation. The yarns will then pick up their respective drop devices and after the machine has started the operator can throw the stationary stop member into operative position, where it will remain locked until the machine is again stopped, when said stationary stop member will automatically be thrown out of operative position again and held in that position.

The invention further embodies an alarm device which warns the operator when the machine is running that the stationary stop member is held out of operative position.

The invention consists in the combination and arrangement of parts set forth in the following specification and particularly pointed out in the claims thereof.

Referring to the drawings: Figure 1 is a sectional plan of my improved stop mechanism. Fig. 2 is a sectional elevation taken on line 2—2 of Fig. 1. Fig. 3 is a diagrammatic sectional view illustrating the drop device and rotary and stationary stop members.

Like numerals refer to like parts throughout the several views of the drawings.

In the drawings, 10 is the frame of the machine, 11 is the main driving shaft, 12 is a pulley forming one member of a clutch and 13 is the other member of the clutch.

14 is a rock-shaft having an arm 15 thereon which engages the clutch member 13 to throw the same into or out of engagement with the clutch pulley 12.

16 is the stop mechanism and 17 the brake.

18 is a dog fast to a rock-shaft 19 which, when rocked, releases an arm 20 and allows the stop mechanism to operate to throw the clutch member 13 out of engagement with the clutch pulley 12 and to operate the brake 17 to stop the machine.

21 and 22 are rotary shafts to which are fastened toothed disks 23 and 24 constituting rotary stop members.

25 and 26 are normally stationary stop members comprising bars extending longitudinally of the machine and arranged to slide thereon.

27 and 28 are drop devices arranged to slide on vertical guides 29 and 30 which are fastened, respectively, to the stationary stop members 25 and 26.

31 and 32 are rock-shafts having arms 33 and 34, respectively, fastened thereto, said rock-shafts being connected together by a connecting rod 35.

The mechanism hereinbefore specifically described is substantially the same as disclosed in said co-pending application for Letters Patent.

The normally stationary stop 25 is moved toward the rotary stops 23 by an arm 36 which is fastened to the rock-shaft 31 and said stationary stop 25 is moved away from the rotary stops 23 by an arm 37 also fastened to the rock-shaft 31 and terminating in an outwardly extending handle 38 whereby said rock-shaft may be rocked by hand. The arm 36 extends upwardly from the rock-shaft 31 engaging the rear side of the slidable stationary stop 25 and has attached thereto an arm 39 which has a counterweight 40 adjustably fastened thereto.

A link 41 is pivoted at 42 to the upper end of the arm 36 and at its free end projects through a slot 43 in a stop plate 44. Said link is provided in its upper edge with a notch 45 into which the upper edge of said slot 43 projects. Said link 41 is held in the position illustrated in Fig. 2 by a spring 46.

An arm 47 fast to the rock-shaft 14 is adapted to engage the upper end of the link 41 when the stop motion mechanism is operated, to throw the link 41 downwardly out of engagement with the upper edge of the slot 43, whereupon the arm 39 will cause the arm 36 to be tipped from the position illustrated in full lines to the position shown in dotted lines (Fig. 2), thus through the arm 37 causing the normally stationary stop member 25 to be moved out of operative position relatively to the rotary stop member 23. It is evident that a spring may be used to move the arm 36 from the position shown in full lines to that shown in dotted lines instead of employing the weighted arm 39 without departing from the spirit of my invention.

A handle 48 fastened to the rock-shaft 14 enables said rock-shaft to be manually operated when desired.

An arm 49 is fastened to the rock-shaft 32 and engages the rear side of the normally stationary stop 26. Another arm 50 engages the front edge of said stop and is also fastened to the rock-shaft 32, said arm 50 being provided with a handle 51 by means of which it may be manually operated.

When the stationary stop 25 is moved away from its rotary stop members 23, it will be seen that the stationary stop 26 will be moved away from said rotary stop members 24 through the medium of the connecting rod 35 and arm 34.

An arm 52 is fastened to the rock-shaft 31 which engages a spring clicker 53 constituting an alarm device, when the stationary stop members are in position. Said clicker 53 is fastened to a stationary member 54 and is bent upwardly at its free end to engage one of the rotary stop members 23 when the stationary stop members are out of operative position relatively to the rotary stop members, but when the stationary stop members are in operative position, then the arm 52 engages the clicker 53 and moves it downwardly out of contact with the rotary stop member 23. When the rock-shaft 31 is rocked so that the stationary stop member 25 is out of operative position, then the arm 52 which is fastened to the rock-shaft 31 assumes the position illustrated in dotted lines (Fig. 2) and releases the clicker 53 so that the same will spring upwardly and into engagement with one of the rotary stop members 23 and as said rotary stop member is rotated the free end of the clicker 53 will snap over the teeth of said rotary stop member, making a clicking sound to warn the operator that the stationary stop members are out of operative position, whereupon, if the tension upon the yarn has at that time increased sufficiently to raise the drop devices upon their guide wires 29 the operator throws the stationary stop members 25 and 26 into operative position by means of one of the handles 38 or 51.

The general operation of the mechanism which has been specifically and to some extent in general described is as follows: Assuming the machine to be in operation and the parts to be in the relative positions illustrated in the figures of the drawings, if a thread slackens or breaks or if, for any reason, the normal and proper operation of the machine and feeding of the yarn is interfered with, one of the drop devices, say the drop device 27, will drop and will be guided by its guide wires 29 into interlocking engagement with the rotary stop member 23 and the stationary stop member 25, whereupon rotation of the shaft 21 will be stopped and through suitable mechanism will operate the stop mechanism 16 in the manner set forth in said copending application to throw the clutch member 13 out of operative engagement with the clutch pulley 12 and the brake 17 will be set to stop the machine. During the latter part of this stopping operation the rock-shaft 14 will cause the rocker arm 47 to engage the link 41 and move the same downwardly so that the weighted arm 36 will cause said link 41 to be moved from the position illustrated in full lines to that illustrated in dotted lines (Fig. 2), the arm 36 assuming the position illustrated in dotted lines in said figure. This will cause the stationary stop members 25 and 26, with their respective guide wires and drop devices to be moved out of operative position relatively to their respective rotary stop members, as hereinbefore described. At the same time the arm 52 will be moved from the position shown in full lines (Fig. 2) to that shown in dotted lines and the clicker 53 will come into contact with one of the rotary stop members 23. The machine is now stopped. After the difficulty which has caused the machine to stop has been remedied the operator releases the brake and sets the stop motion in the position shown in Fig. 1, he then throws the clutch in and the machine starts, and as soon as the tension on the yarns has become sufficient to cause said yarns to pick up the different drop devices and the operator is warned by the clicker 53 snapping over the teeth of one of the rotary stop members that the stationary stop members are out of position, he throws these stationary stop members into position by means of the handle 38 or 51 or by means of the arm 36, whichever may be the most convenient. When this is done the link 41 is moved to the position illustrated in full lines (Fig. 2) and is held up against the stop plate 44, with the notch 45 in engagement therewith, by the spring 46. The machine is then in operative position in every respect and the stop mechanism set ready to detect any other flaw that may appear in the yarn or any difficulty that may develop in the feeding of said yarn.

It will be understood that if the operator wishes to stop the machine for any reason such for instance as to put in a broken needle, examine the fabric, put on a new bobbin etc., he can throw the clutch member 13 out by means of the handle 48 and the machine will then stop of its own inertia without setting the brake or actuating the stop mechanism, but the movable stop member will be thrown out because the arm 47 will engage the link 41 and allow the weighted arm 39 to throw the arm 36 back and the movable stop member will be moved back out of operative position. The resulting advantage being that the operator can turn the machine by hand as he may desire without having to turn it against the friction of the brake and furthermore when the machine is again started the operator does not have to release the brake and set the stop motion but can throw in the clutch and immediately start the machine in operation, and then when the yarns have picked up their respective drop devices he moves the movable stop forward into operative position and said stop becomes automatically locked in position by the arm 36 and link 41.

It will further be understood that in every case whether the machine is stopped automatically or by hand that the dropping of the drop wires and the stopping of the machine occurs before the movable stop is moved out of operation and then just as the machine has stopped the movable stop is operated to throw the same out of operative position and the drop wires are freed ready to be lifted by the yarns when the machine is again started.

I claim:

1. A stop motion mechanism for a knitting machine having, in combination, a driving shaft, a rotary stop member, a normally stationary stop member, means constructed and arranged to move said stationary stop member out of operative position relatively to said rotary stop member, means to lock said stationary stop member in operative position relatively to said rotary stop member, a drop device constituting a guide for a strand of yarn and normally held out of engagement with said stops by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary member may be stopped, mechanism actuated by the stopping of said rotary stop member constructed and arranged to stop the rotation of said driving shaft, and means to operate said locking means to release said stationary stop member and allow the same to be moved into inoperative position.

2. A stop motion mechanism for a knitting machine having, in combination, a driving shaft, a rotary stop member, a normally stationary stop member, means constructed and arranged to move said stationary stop member out of operative position relatively to said rotary stop member, means to lock said stationary stop member in operative position relatively to said rotary stop member, a drop device constituting a guide for a strand of yarn and normally held out of engagement with said stops by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary member may be stopped, mechanism actuated by the stopping of said rotary stop member constructed and arranged to stop the rotation of said driving shaft and means actuated by said last-named mechanism to operate said locking means to release said stationary stop member and allow the same to be moved into inoperative position.

3. A stop motion mechanism for a knitting machine having, in combination, a driving shaft, a driven member constituting a stop, a normally stationary stop member adjacent thereto and movable toward and away from said driven member, means constructed and arranged to move said stationary stop member out of operative position relatively to said driven member, means to lock said normally stationary stop member in operative position relatively to said driven member, a drop device constituting a guide for a strand of yarn and normally held out of engagement with said stops by said yarn when under tension during the operation of said knitting machine, means movable with said normally stationary stop member constructed and arranged to guide said drop device between and into interlocking engagement with said stops when said drop device is allowed to drop by said yarn, whereby while said normally stationary stop member is stationary the movement of said driven member may be stopped, mechanism actuated by the stopping of said driven member constructed and arranged to stop the rotation of said driving shaft and means to operate said locking means to release said stationary stop member and allow the same to be moved into inoperative position.

4. A stop motion mechanism for a knitting machine having, in combination, a driving shaft, a rotary stop member, a slide adjacent thereto normally stationary and constituting a stop, means constructed and arranged to move said slide out of operative position relatively to said rotary stop member, means to lock said slide in operative position relatively to said rotary stop member, a drop device constituting a guide for a strand of yarn and normally held out of engagement with said stops by said yarn when under tension during the operation of said knitting machine, means constructed and arranged to guide said drop device between and into interlocking engagement with said stops when said drop device is allowed to drop by said yarn, whereby while said slide is stationary the rotation of said rotary stop member may be stopped, mechanism actuated by the stopping of said rotary stop member constructed and arranged to stop the rotation of said driving shaft and means to operate said locking means to release said stationary stop member and allow the same to be moved into inoperative position.

5. A stop motion mechanism for a knitting machine having, in combination, a driving shaft, a plurality of rotary stop members, a normally stationary stop member adjacent thereto common to all of said rotary stop members, means constructed and arranged to move said stationary stop member out of operative position relatively to said rotary stop members, means to lock said stationary stop member in operative position relatively to said rotary stop members, a plurality of drop devices, each constituting a guide for a strand of yarn and normally held out of engagement with said stops by said yarn when under tension during the operation of said knitting machine, means movable with said normally stationary stop member and constructed and arranged to guide said drop devices between and into interlocking engagement with said stops when said drop devices are allowed to drop by said strands of yarn, whereby the rotation of said rotary stop members may be stopped while said normally stationary stop member is stationary, mechanism actuated by the stopping of said rotary stop member constructed and arranged to stop the rotation of said driving shaft and means to operate said locking means to release said stationary stop member and allow the same to be moved into inoperative position.

6. A stop motion mechanism for a knitting machine having, in combination, a driving shaft, a plurality of series of rotary stop members, a normally stationary stop member adjacent to each of said series of rotary stop members, respectively, means constructed and arranged to move said stationary stop members out of operative position relatively to said rotary stop members, means to lock said stationary stop members in operative position relatively to said rotary stop members, a drop device for each of said rotary stop members, said drop devices each constituting a guide for a strand of yarn and normally held out of engagement with said rotary stop member by said yarn when under tension during the operation of said knitting machine, means mounted on each of said normally stationary stop members constructed and arranged to guide each of said drop devices between and into interlocking engagement with each of said rotary stop members and its respective stationary stop member, whereby the rotation of said rotary stop members may be stopped and means to automatically operate said locking means to release said stationary stop member and allow the same to be moved into inoperative position.

7. A stop motion mechanism for a knitting machine having, in combination, a driving shaft, a rotary stop member, a normally stationary stop member, an arm constructed and arranged by its weight to move said stationary stop member out of operative position relatively to said rotary stop member, a link pivoted to said arm and constructed and arranged to engage a stationary member, whereby said stationary stop member may be locked in operative position relatively to said rotary stop member, a drop device constituting a guide for a strand of yarn and normally held out of engagement with said stop by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary stop member may be stopped, mechanism actuated by the stopping of said rotary stop member constructed and arranged to stop the rotation of said driving shaft and means included in said last named mechanism to operate said locking means to release said stationary stop member and allow the same to be moved into inoperative position.

8. A stop motion mechanism for a knitting machine having, in combination, a driving shaft, a rotary stop member, a normally stationary stop member, an arm constructed and arranged by its weight to move said stationary stop member out of operative position relatively to said rotary stop member, a link pivoted to said arm and constructed and arranged to engage a stationary member, whereby said stationary stop member may be locked in operative position relatively to said rotary stop member, a drop device constituting a guide for a strand of yarn and normally held out of engagement with said stop by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary stop member may be stopped, mechanism actuated by the stopping of said rotary stop member constructed and arranged to stop the rotation of said driving shaft and mechanism embodying a rock-shaft and an arm fast to said rockshaft adapted to engage said link to release the same from said stationary member and allow said stationary member to be moved into inoperative position.

9. A stop motion mechanism for a knitting machine having, in combination, a driving shaft, a rotary stop member, a normally stationary stop member, means constructed and arranged to move said stationary stop member out of operative position relatively to said rotary stop member, means to lock said stationary stop member in operative position relatively to said rotary stop member, a drop device constituting a guide for a strand of yarn and normally held out of engagement with said stops by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary stop member may be stopped, mechanism actuated by the stopping of said rotary stop member constructed and arranged to stop the rotation of said driving shaft, means to operate said locking means to release said stationary stop member and allow the same to be moved into inoperative position and means to sound an alarm when said stationary stop member is out of operative position.

10. A stop motion mechanism for a knitting machine having, in combination, a driving shaft, a rotary stop member, a normally stationary stop member, means constructed and arranged to move said stationary stop member out of operative position relatively to said rotary stop member, means to lock said stationary stop member in operative position relatively to said rotary stop member, a drop device constituting a guide for a strand of yarn and normally held out of engagement with said stops by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary stop member may be stopped, mechanism actuated by the stopping of said rotary stop member constructed and arranged to stop the rotation of said driving shaft and means to sound an alarm when said stationary stop member is out of operative position relatively to said rotary stop member.

11. A stop motion mechanism for a knitting machine having, in combination, a driving shaft, a rotary stop member, a normally stationary stop member, means constructed and arranged to move said stationary stop member out of operative position relatively to said rotary stop member, means to lock said stationary stop member in operative position relatively to said rotary stop member, a drop device constituting a guide for a strand of yarn and normally held out of engagement with said stops by said yarn when under tension during the operation of said knitting machine, means constructed and arranged to guide said drop device between and into interlocking engagement with said stops when said drop device is allowed to drop by said yarn, whereby while said normally stationary stop member is stationary the rotation of said rotary stop member may be stopped, mechanism actuated by the stopping of said rotary stop member constructed and arranged to stop the rotation of said driving shaft, means to operate said locking means to release said stationary stop member and allow the same to be moved into inoperative position, a spring-actuated clicker arranged to engage a rotary member, and means adapted to move said clicker out of and into operation when said stationary stop member is respectively located in operative position relatively to said rotary stop member or out of operative position relatively thereto.

In testimony whereof I have hereunto set my hand in presence of two subscribing witnesses.

WILLIAM T. BARRATT.

Witnesses:
CHARLES S. GOODING,
CHARLES S. KEHOE.

Copies of this patent may be obtained for five cents each, by addressing the "Commissioner of Patents, Washington, D. C."